United States Patent [19]

Maguire

[11] Patent Number: 5,190,254
[45] Date of Patent: Mar. 2, 1993

[54] AMPLIFIER STAND

[76] Inventor: Michael D. Maguire, 39 Theresa Ct., Stamford, Conn. 06907

[21] Appl. No.: 820,294

[22] Filed: Jan. 13, 1992

[51] Int. Cl.$^5$ ............................................. F16M 11/00
[52] U.S. Cl. ..................................... 248/164; 248/166
[58] Field of Search ................... 248/164, 432, 163.2, 248/431, 166, 163.1

[56] References Cited

U.S. PATENT DOCUMENTS

| | | | |
|---|---|---|---|
| 282,286 | 7/1883 | Dikeman | 248/163.2 |
| 1,908,827 | 5/1933 | Driver et al. | 248/432 |
| 2,573,915 | 11/1951 | Lewis | 248/164 |
| 2,645,442 | 7/1953 | Brodine | 248/164 |
| 2,676,709 | 4/1954 | Walsh | 248/432 X |
| 2,939,584 | 6/1960 | Bergman, Jr. | 248/164 X |
| 3,236,387 | 2/1966 | Perini | 248/164 X |
| 3,839,754 | 10/1974 | Hooper | 248/164 X |
| 4,029,278 | 6/1977 | Napoleon | 248/164 X |
| 5,024,407 | 6/1991 | Bartley | 248/164 |

Primary Examiner—David L. Talbott
Attorney, Agent, or Firm—F. Eugene Davis, IV

[57] ABSTRACT

The collapsible amplifier stand comprises a pair of U-shaped portions preferably formed out of tubular steel, one of which fits within the other. They are joined at their leg portions by axles having a common axis. Straps are connected between the leg portions to limit the distance between the bight portions when the stand is opened. The bight portions have a pair of straps connected therebetween. The straps are much longer than the maximum distance permitted between the bight portions and thus form a sling for an amplifier to be supported in the sling between the bight portions. The distance between the bight portions and the axles is less than the distance between the ends of the legs and the axles so that the ends of the legs are spaced horizontally outward from the bight portions when the amplifier stand is in use.

21 Claims, 2 Drawing Sheets

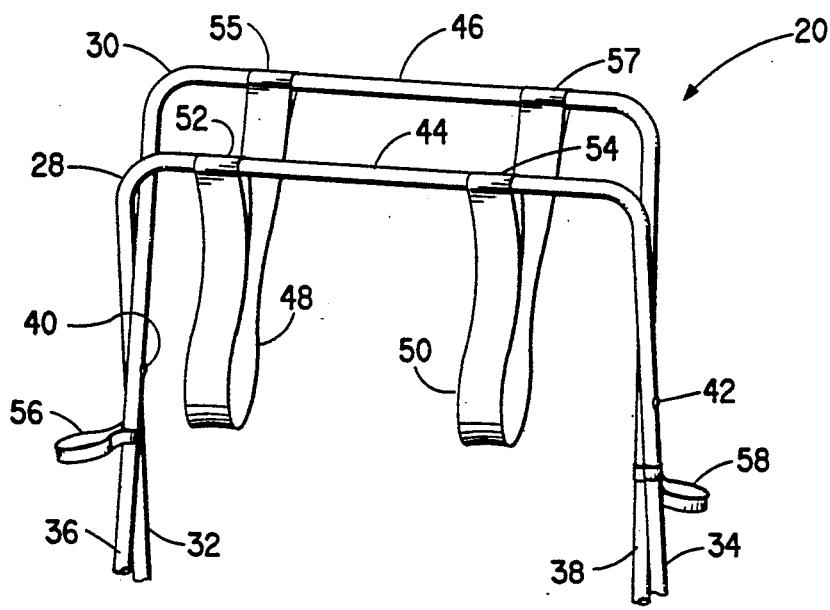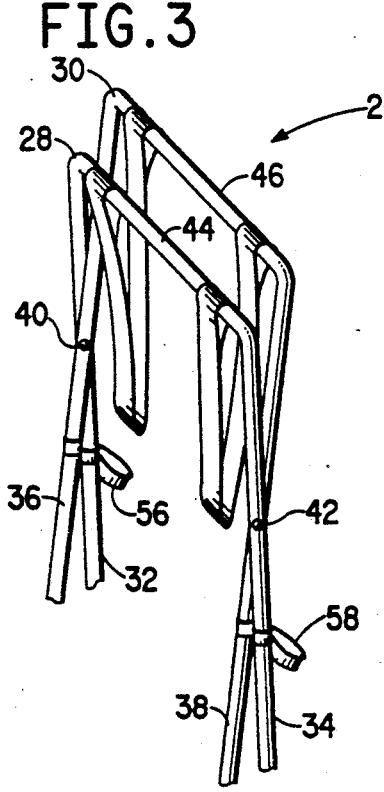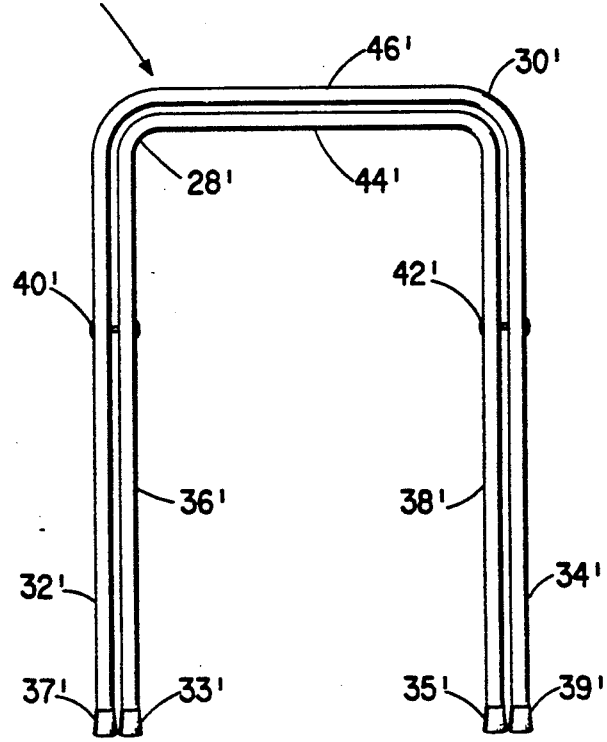

AMPLIFIER STAND

TECHNICAL FIELD

This application relates to amplifier stands used by performing musicians.

BACKGROUND ART

Musicians performing popular music today utilize large electronic amplifiers often employing electron tubes rather than transistors and often integrated with loud speakers. During a typical gig, the musicians like to elevate these amplifiers and speakers off of the floor and often utilize makeshift stands such as stools, chairs, boxes, and the like. This invariably results in accidents when the amplifiers are accidentally knocked off the stand or pulled off of the stand by cables connected thereto.

DISCLOSURE OF THE INVENTION

I have invented an amplifier and speaker stand which is collapsible, easy to carry, supports an amplifier or speaker in a very stable condition, and can be manufactured at low cost. The stand comprises two U-shaped members formed preferrably of tubular steel, one of which fits inside the other. These members are joined by axles at a common axis passing through their legs Straps connected between the legs prevent the legs opening more than a predetermined distance and thus the bights from spreading apart more than a predetermined distance. The bights are connected together by two straps much longer than the distance between the bights forming a sling for the amplifier which is cradled in the stand between the bights. If the electronics is located in the lower portion of the amplifier, the center of gravity of the amplifier may even be located below the axis of the axles. One of the bights is higher than the other and forms the back of the stand supporting the back of the amplifier which may be leaned backwards against it. The weight of the amplifier causes the bights to close against it, securely holding it.

The placement of the axles is such that the feet of the legs of my stand are located outside of the bight portions thus adding to the stability of the stand.

OBJECTS OF THE INVENTION

It is therefore an object of the invention to provide an amplifier stand.

Another object of the invention is to provide an amplifier stand which is collapsible.

A further object of the invention provides such an amplifier stand that will very stably support an amplifier or speaker.

A further object of the invention is to provide an amplifier stand at low cost.

Other objects of the invention will in part be obvious and will in part appear hereinafter.

The invention accordingly comprises the features of construction, elements, and arrangements of elements and parts which will be exemplified in the constructions hereinafter set forth. The scope of the invention will be indicated in the claims.

BRIEF DESCRIPTION OF THE DRAWINGS

For a fuller understanding of the nature and objects of my invention, reference should be had to the following detailed description taken in connection with the accompanying drawings, in which:

FIG. 2 is a partial perspective view of my amplifier stand in folded condition;

FIG. 3 is another partial view of my amplifier stand in folded condition; and

FIG. 4 is a diagrammatic view of an alternative embodiment of my invention.

The same reference characters refer to the same elements throughout the several views of the drawings.

BEST MODE FOR CARRYING OUT THE INVENTION

Figure 1:
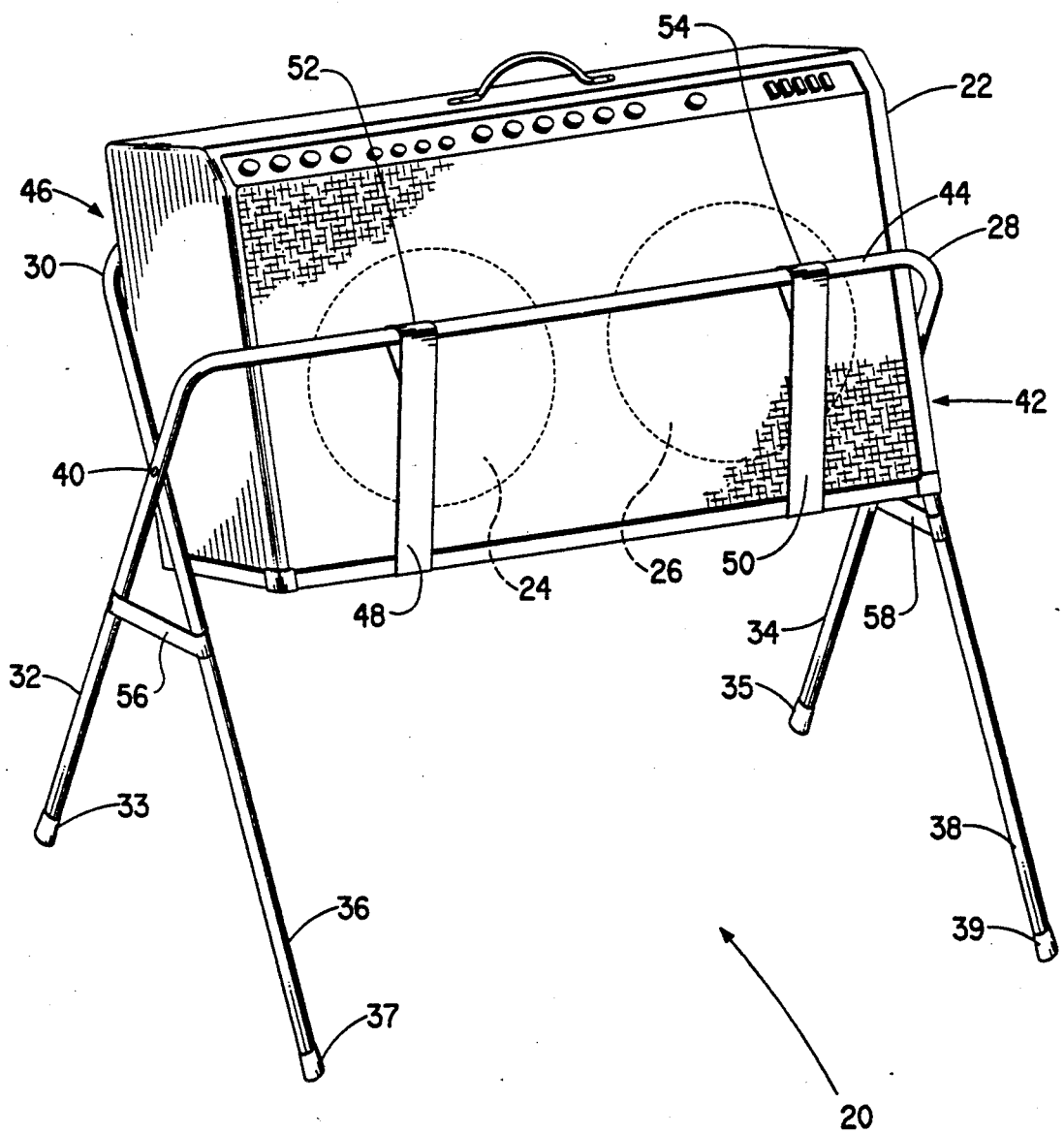
FIG. 1 is a perspective view of my new amplifier stand with an amplifier supported therein.

Now referring to FIGS. 1 to 3, an amplifier stand, according to my invention, is generally indicated at 20. It is shown in FIG. 1 supporting amplifier 22 which comprises speakers 24 and 26.

The amplifier stand 20 comprises two U-shaped members 28 and 30 having legs 32-34 and 36-38, respectively. Each leg is provided with a rubber cup 33, 35, 37 and 39. The legs are joined at axles 40 and 42, only axle 40 of which is shown in FIG. 1. The axles 40 and 42 are aligned on the same axis. The legs are joined by bight portions 44 and 46 only 44 being shown in FIG. 1. The bight portions 44 and 46 are joined by flexible fabric straps 48 and 50, preferably formed of polypropolene. The straps 48 and 50 are affixed to the bights 44 and 46 by loops 52-54, 55-57, only loops 52 and 54 of which are shown in FIG. 1. The loops are formed by stitching or the like and may be fixed on the bights 44 and 46 by rivets, not shown.

The legs are limited in the degree to which they may spread apart by means of polypropolene fabric straps 56 and 58 which may be joined to the legs 32-36, 34-38 by means of pop rivets not shown. As can be seen in FIG. 1, the length of the legs from the ends thereof to the axles 40-42 are substantially greater than the distance between the axles 42-44 and the bights 44-46. This puts the ends or feet of the legs 32-36 and 34-38 outside of the footprint of the amplifier 22 and outside of the footprint of the bights 44 and 46. That is, the distance between the bights 42 and 46 when they are the farthest apart is less than the distance between the ends of the legs, thus making a very stable support. Furthermore, the U-shaped member 30 has longer legs than the U-shaped member 28 and thus the bight 46 thereof is higher off the floor than the bight 44. The bight 46 can therefore support the rear of the amplifier 22 when it is tilted rearwardly as shown in FIG. 1.

Also when the mass of the amplifier 22 is located towards the bottom thereof, the center of gravity is either close to or below the axis formed by axles 40 and 42, thus aiding the stability of the stand. In FIG. 2, it can be seen how bight 46 is above bight 44 when the stand is shown in collapse condition. The same can be seen in FIG. 3.

The use of flexible straps 56-58 or other means which do not keep the legs 32, 34, 36, 38 spread apart permits the weight of an amplifier supported in the stand to force the bights 44-46 against the amplifier, holding it firmly.

In FIG. 1, the stand is shown with the larger U-shaped member inside the smaller U-shaped member. This does not allow the stand to be completely collapsed. If desired, as shown in FIG. 4, the larger U-shaped member 30' may be located outside the smaller U-shaped member 32'; the members being joined at axles 40' and 44', as shown. The other elements of the stand shown in FIG. 4 are identified by the same reference characters as in FIGS. 1-3 except they are primed.

Those skilled in the art will understand that the straps 48 and 50 form a sling and may take the form of a single fabric or netted fabric sling. The means 56 and 58 that prevent the legs from opening too far but allow them to close, may be located above the axles 40 and 42, as well as below and may take other convenient forms. The amplifier stand may be made in various sizes to fit various size amplifiers.

An amplifier stand, which I have constructed, which works well with a wide variety of amplifiers, is formed of $\frac{7}{8}$" diameter steel tubing. The outer U-shaped member, as shown in FIG. 1, is 29" wide at the axles 40 and 42 and approximately $31\frac{1}{2}$" from the top of the bight 44 to the ends of the legs 32-34. The rear U-shaped portion 30 is approximately 29" outside dimension between the legs 36 and 38 at the axles 40-42 and is $36\frac{1}{2}$" from the bight 46 to the ends of the legs 36-38. The straps 48 and 50 measure 37" while the maximum distance between the bights is approximately $12\frac{1}{4}$ inches and the straps 56-58 provide approximately 10" between their attachments to the legs 32-36 and 34-38. The distance between the axles 40-42 and the ends of the legs 32-34 and 36-38 is 22" while the distance from the axles 40-42 to the top of the bights 44 and 46 is approximately $10\frac{1}{2}$" and $13\frac{1}{2}$", respectively.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. An amplifier stand comprising:
   A. a pair of U-shaped frame members each having a pair of legs and a bight portion therebetween;
   B. a pair of axially aligned axle means joining said legs for relative rotation of said frame members around said axis, the length of said legs above said axle means being less than below said axle means;
   C. means for limiting the maximum distance permitted between said bight portions yet permitting said bight portions to otherwise freely move toward and away from each other; and,
   D. sling means fastened to each of said bight portions, said sling means being of greater length than the maximum distance permitted between said bight portions, whereby when an amplifier is placed in said sling means, said bight portions move against the amplifier and the lower ends of said legs are all located outside the vertical projection of said bight portions.

2. The amplifier stand of claim 1 wherein said sling means is a pair of straps.

3. The amplifier stand of claim 1 wherein one of said U-shaped members comprises legs of greater length than the other of said U-shaped members and said axles are placed such that when said bight portions are spread apart and said legs are set on a horizontal surface, the bight portion of said one U-shaped portion is higher than the other bight portion.

4. The amplifier stand of claim 3 wherein said one U-shaped portion fits outside the other of said U-shaped portion.

5. The amplifier stand of claim 3 wherein said one U-shaped portion fits inside the other of said U-shaped portion.

6. The amplifier stand of claim 3 wherein said sling means is substantially longer than the sum of the length of said legs between said axle means and said bight portions.

7. The amplifier stand of claim 1 wherein said means for limiting the distance between said bight portions is connected between said legs on the side of said axis away from said bight portions.

8. The amplifier stand of claim 1 wherein said limiting means comprises straps.

9. The amplifier stand of claim 1 wherein said sling means is substantially longer than the sum of the length of said legs between said axle means and said bight portions.

10. An amplifier stand comprising:
    A. a pair of forward and rearward supports;
    B. means for allowing said forward and rearward supports to move freely toward and away from each other a predetermined amount; and,
    C. sling means attached between said supports and being substantially longer than the maximum distance permitted between them;

whereby when an amplifier is placed between said supports in said sling, said supports are caused to move towards each other against said amplifier.

11. The amplifier stand of claim 10, and,
    D. legs supporting said supports, said legs terminating in feet all of which are located outside the vertical projection of said supports on a floor which said feet rest when said stand is supporting an amplifier in said sling means.

12. The amplifier stand of claim 11 wherein one of said supports is higher than the other.

13. The amplifier stand of claim 12 wherein said supports take the form of horizontal bars.

14. An amplifier stand comprising:
    A. a pair of U-shaped frame members each having a pair of legs and a bight portion therebetween;
    B. a pair of axially aligned axle means joining said legs for relative rotation of said frame members around said axis, the length of said legs above said axle means being less than below said axle means;
    C. means for limiting the maximum distance permitted between said bight portions to otherwise freely move toward and away from each other; and,
    D. sling means fastened to each of said bight portions, said sling means being of greater length than the maximum distance permitted between said bight portions.

whereby when an amplifier is placed in said sling means, the lower ends of said legs are all located outside the vertical projection of said bight portions.

15. The amplifier stand of claim 14 wherein said limiting means comprises means permitting said bight portions to close against an amplifier supported in said sling.

16. The amplifier stand of claim 15 wherein said limiting means comprises straps.

17. The amplifier stand of claim 14 wherein one of said U-shaped members comprises legs of greater length than the other of said U-shaped members and said axles are placed such that when said bight portions are spread apart and said legs are set on a horizontal surface, the bight portion of said one U-shaped portion is higher than the other bight portion.

18. The amplifier stand of claim 17 wherein said one U-shaped portion fits outside the other of said U-shaped portion.

19. The amplifier stand of claim 17 wherein said one U-shaped portion fits inside the other of said U-shaped portion.

20. The amplifier stand of claim 14 wherein said sling means is substantially longer than the sum of the length of said legs between said axle means and said bight portions.

21. The amplifier stand of claim 20 wherein one of said U-shaped members comprises legs of greater length than the other of said U-shaped members and said axles are placed such that when said bight portions are spread apart and said legs are set on a horizontal surface, the bight portion of said one U-shaped portion is higher than the other bight portion.

* * * * *